United States Patent [19]

Engheta et al.

[11] Patent Number: 5,165,059
[45] Date of Patent: Nov. 17, 1992

[54] WAVEGUIDES USING CHIRAL MATERIALS

[75] Inventors: Nader Engheta, King of Prussia; Dwight L. Jaggard, Newtown Square, both of Pa.

[73] Assignee: The Trustees of the University of Pennsylvania, Philadelphia, Pa.

[21] Appl. No.: 734,053

[22] Filed: Jul. 22, 1991

Related U.S. Application Data

[63] Continuation of Ser. No. 359,586, Jun. 1, 1989, abandoned.

[51] Int. Cl.⁵ .............................. G02B 6/00
[52] U.S. Cl. .................. 385/142; 385/130; 385/28; 385/42
[58] Field of Search ............ 307/425; 350/96.12, 350/96.3, 96.32, 96.34, 96.29; 385/129, 130, 141, 142

[56] References Cited

U.S. PATENT DOCUMENTS

| | | | |
|---|---|---|---|
| 4,536,450 | 8/1985 | Garito | 350/96.34 |
| 4,659,177 | 4/1987 | Choe et al. | 350/96.34 |
| 4,786,147 | 11/1988 | Clerc et al. | 350/349 |
| 4,813,771 | 3/1989 | Handschy et al. | 350/350 S |
| 4,818,899 | 4/1989 | Tiers | 307/425 |
| 4,839,536 | 6/1989 | Etter et al. | 307/425 |

OTHER PUBLICATIONS

D. L. Jaggard et al., *Applied Physics*, "on Electro Magnetic Waves in Chiral Media", 18, 211, 1979.

S. Bassiri et al, *Alta Frequenza*, "Dyadic Green's Function and Dipole Radiation in Chiral Media", pp. 83-88, 1986.

N. Engheta et al., *IEEE Trans. on Ant. & Propag.*, vol 37, No. 4, Apr. 1989; pp. 512-515.

S. Bassiri et al., *J. Opt. Soc. Am.* vol. 5, No. 9, Sep. 1988; pp. 1450-1459.

*Primary Examiner*—John D. Lee
*Assistant Examiner*—John Ngo
*Attorney, Agent, or Firm*—Synnestvedt & Lechner

[57] ABSTRACT

Guided-wave structures comprising chiral materials. Guided-wave structures provided in accordance with this invention comprise chiral materials wherein bifurcated electromagnetic modes are allowed. The guided-wave structures are particularly useful for directional couplers, switches and modulators.

5 Claims, 3 Drawing Sheets

WAVEGUIDES USING CHIRAL MATERIALS

This is a continuation of application Ser. No. 359,586, filed Jun. 1, 1989, now abandoned.

FIELD OF INVENTION

Generally this invention relates to guided-wave structures. More specifically, this invention relates to guided-wave structures comprising chiral materials.

BACKGROUND OF THE INVENTION

It has been shown that, for time-harmonic electromagnetic fields with $\exp(-i\omega t)$ excitation, a homogeneous, low loss, isotropic chiral (optically active) medium can be described electromagnetically by the following constitutive relations:

$$D = \epsilon E + i\xi_c B \qquad (1)$$

$$H = i\xi_c E + (1/\mu) B \qquad (2)$$

where E, B, D and H are electromagnetic field vectors and $\epsilon$, $\mu$, $\xi_c$ represent the dielectric constant, permeability and chirality admittance of the chiral medium, respectively. A "chiral medium" comprises chiral objects of the same handedness, randomly oriented and uniformly distributed. A chiral object is a three-dimensional body that cannot be brought into congruence with its mirror image by translation and rotation. Therefore, all chiral objects can be classified in terms of their "handedness." The term "handedness," as known by those with skill in the art, refers to whether a chiral object is "right-handed" or "left-handed." That is, if a chiral object is right-handed (left-handed), its mirror image is left-handed (right-handed). Therefore, the mirror image of a chiral object is its enantiomorph.

Chiral media exhibit electromagnetic chirality which embraces optical activity and circular dichroism. Optical activity refers to the rotation of the plane of polarization of optical waves by a medium while circular dichroism indicates a change in the polarization ellipticity of optical waves by a medium. There exists a variety of materials that exhibit optical activity. For example, for 0.63-$\mu$m wavelength, $TeO_2$ exhibits optical activity with a chirality admittance magnitude of $3.83 \times 10^{-7}$ mho. This results in a rotation of the plane of polarization of 87° per mm. These phenomena, known since the mid nineteenth century, are due to the presence of the two unequal characteristic wavenumbers corresponding to two circularly polarized eigenmodes with opposite handedness. The fundamentals of electromagnetic chirality have been treated in books by Kong [J. A. Kong, *Theory of Electromagnetic Waves*, 1975] and Post [E. J. Post, *Formal Structure of Electromagnetics*, 1962]. More recent work includes the macroscopic treatment of electromagnetic waves with chiral structures [D. L. Jaggard et al. Applied Physics, 18, 211, 1979], the analysis of dyadic Green's functions and dipole radiation in chiral media [S. Bassiri et al. *Alta Frequenza*, 2, 83, 1986; N. Engheta et al. *IEEE Trans. on Ant. & Propag.*, 37, 4, 1989], and the reflection and refraction of waves at a dielectric-chiral interface [S. Bassiri et al. *J. Opt. Soc. Am.* A5, 1450, 1988].

SUMMARY OF THE INVENTION

In accordance with this invention, a guided-wave structure comprising chiral material wherein bifurcated electromagnetic modes are allowed is provided.

DETAILED DESCRIPTION OF PREFERRED EMBODIMENTS

The inventors of the subject matter disclosed and claimed herein have achieved novel results in the theoretical investigation of the guided-wave structures comprising chiral materials. The terms "chirowaveguide", "waveguide" and "guided-wave structures" are used interchangeably throughout the present disclosure to denote such structures provided in accordance with the present invention. As known by those with skill in the art, a "guided-wave structure" is a structure wherein the electromagnetic energy of the propagating wave is substantially confined in the region of the structure. Chirowaveguides have a variety of potential applications in integrated optics, electronic devices and optical communications systems, as well as in their millimeter wave and microwave counterparts.

Figure 1:
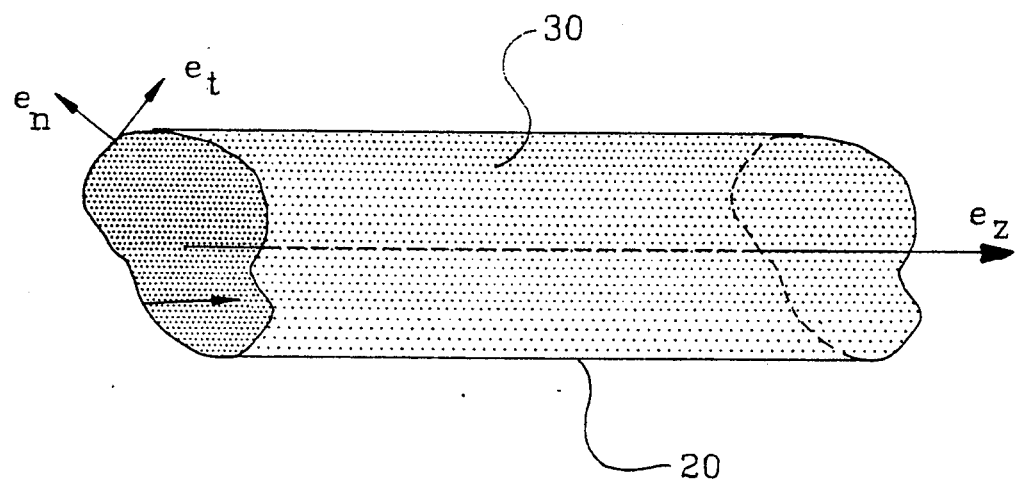
FIG. 1 is a chirowaveguide provided in accordance with this invention comprising a chiral material with constitutive parameters $\epsilon$, $\mu$, $\xi_c$. $e_n$, $e_\tau$ and $e_z$ are unit vectors normal to the boundary.

Referring now to the drawings wherein like reference numbers refer to like elements, FIG. 1 shows a waveguide 20 of arbitrary cross-sectional shape with its axis in the direction of the z axis and filled with a homogeneous, low loss, isotropic chiral material 30 described by Eqs. (1) and (2).

Using the constitutive relations (1) and (2), and the source-free Maxwell equations, one obtains the following chiral Helmholtz equations $$\nabla \times \nabla \times \binom{E}{H} - 2\omega\mu\xi_c \nabla \times \binom{E}{H} - k^2 \binom{E}{H} = 0 \qquad (3)$$

for the field vectors E and H, with $k = \omega\sqrt{\mu\epsilon}$ where $\omega$ is the radian frequency of the time-harmonic fields. For a plane wave propagation in an unbounded chiral medium, there exist two eigenmodes of propagation, a right-handed and a left-handed circularly polarized (RCP and LCP) plane wave with wavenumbers $$k_\pm = \pm \omega\mu\xi_c + \sqrt{k^2 + (\omega\mu\xi_c)^2} \ . \qquad (4)$$

In the waveguide, however, the direction of propagation is along the z axis. Therefore, all electromagnetic fields have an exp(ihz) as the z-dependence where h is the waveguide propagation constant or wavenumber to be determined. From the Maxwell equations and the constitutive relations (1) and (2), the transverse parts of E and H can be expressed in terms of the longitudinal components of E and H. From this and the Maxwell divergence equations, the following equations are obtained for $E_z$ and $H_z$ in chirowaveguides $$\begin{cases} \nabla_t^2 E_z + \left[ \dfrac{k_+^2 + k_-^2}{2} - h^2 \right] E_z + (2i\omega^2\mu^2\xi_c) H_z = 0 & (5a) \\ \nabla_t^2 H_z + \left[ \dfrac{k_+^2 + k_-^2}{2} - h^2 \right] H_z - (2i\omega^2\mu^2\xi_c/\eta_c^2) E_z = 0 & (5b) \end{cases}$$

The above equations are coupled equations for the longitudinal components of E and H. Therefore, the two components $E_z$ and $H_z$ and their corresponding transverse components are coupled through coupling coefficients which are proportional to the chirality admittance $\xi_c$. This is one of the novel features of chirowaveguides. This implies that there is no mode for which either $E_z$ or $H_z$ is identically zero. In other words, no TE, TM, or TEM modes exist for a chirowaveguide.

Figure 2:
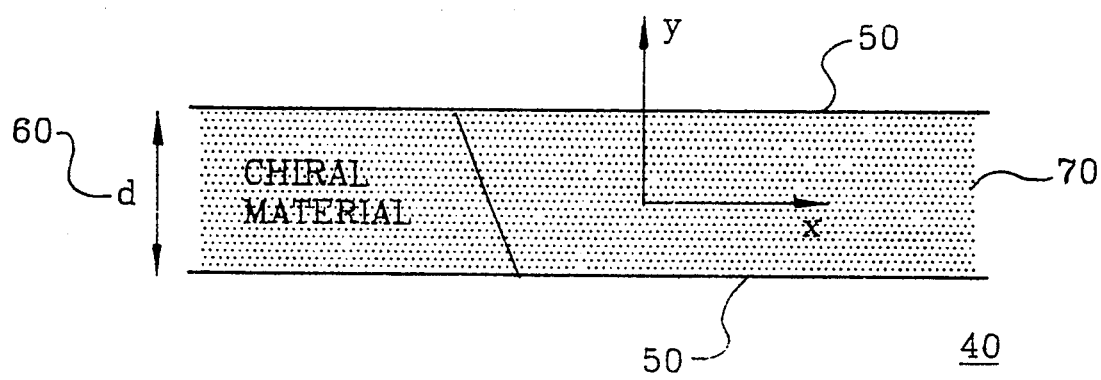
FIG. 2 is a parallel-plate chirowaveguide provided in accordance with this invention. This structure consists of a pair of parallel conducting planes in the x and z directions, separated by a distance d comprising a chiral material with constitutive parameters $\epsilon$, $\mu$, $\xi_c$.

Referring to FIG. 2, a parallel-plate chirowaveguide 40, in preferred embodiments, is shown. This waveguide comprises a pair of parallel conductive plates 50 in the x and z directions, separated by a distance d 60 and further comprising a homogeneous, low loss, isotropic chiral material 70 described by Eqs. (1) and (2) disposed between the plates.

A nontrivial solution for the guided electromagnetic waves inside this chirowaveguide 40 leads to the following dispersion relation $$2\sqrt{(1-(h/k_+)^2)(1-(h/k_-)^2)} \{1 - \cos[k_+d\sqrt{1-(h/k_+)^2}]\cos[k_-d\sqrt{1-(h/k_-)^2}]\} + \quad (6)$$
$$[2 - (h/k_+)^2 - (h/k_-)^2]\sin[k_+d\sqrt{1-(h/k_+)^2}]\sin[k_-d\sqrt{1-(h/k_-)^2}] = 0.$$

where $k_+$ and $k_-$ are defined in Eq. (4). For a given frequency $\omega$, h can be determined from the above equation. The Brillouin diagram of the parallel-plate chirowaveguide, which is the $\omega$-h diagram of Eq. (6) is given in FIG. 3.

Figure 3:
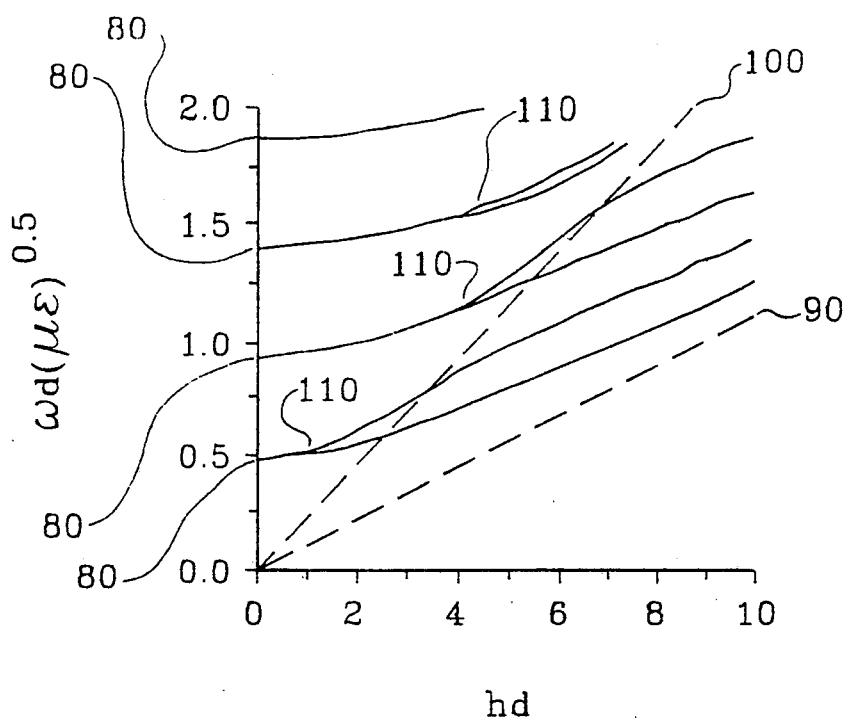
FIG. 3 is a Brillouin diagram for propagating modes guided by the parallel-plate chirowaveguide of FIG. 2 comprising a chiral material with constitutive parameters $\epsilon$, $\mu$, $\xi_c$. Here, $\epsilon = 1/(36\pi \times 10^9)$ F/m, $\mu = 4\pi \times 10^{-7}$ H/m and $\xi_c = 0.001$ mhos.

There are several interesting features in the Brillouin diagram depicted in FIG. 3. First, it is immediately observed that the cut-off frequency 80 for the $n^{th}$ mode in a parallel-plate chirowaveguide is lower than its counterpart (not shown) in a conventional parallel-plate waveguide. Second, it is also observed that, at higher frequency, all the curves approach the $k_+$ 90 ($k_-$ 100) curve for $\xi_c$ positive (negative). Third, it is further observed that TEM mode does not exist, and consequently the lowest cut-off frequency in this parallel-plate chirowaveguide is greater than zero. Finally and most importantly, it can be seen that the curves are bifurcated 110 starting from the cut-off points in the diagram. In other words, for any given frequency greater than the lowest cut-off, there are pairs of modes with unequal wavenumbers or propagation constants and common cut-off frequencies. It can be shown that most of these novel features are also observed in other embodiments of chirowaveguides. The above mentioned features of chirowaveguides have potential applications in integrated optics and optical communications.

One such application is in the areas of optical directional couplers and photonic switches. In directional couplers, which can also be used as optical switches, the goal is to transfer energy from one fiber waveguide, say waveguide A into an adjacent fiber waveguide B. This energy transfer occurs through the overlapping of fields between the two waveguides. It is well known that the maximum energy transferred from guide A to guide B occurs when the phase-matched condition is fulfilled. That is when the wavenumbers of guide A and guide B, $h_A$ and $h_B$, are identical. In conventional integrated optical waveguides, if single-mode operation is used, the phase-matched condition requires that either the two waveguides be identical or only at a specific frequency one can achieve the phase-matched condition. This would put a serious restriction in the design of such couplers. Furthermore, a small change in the design and environment parameters such as small temperature or stress variation would affect the delicate phase-matched condition causing a mismatch in the phase between the two waveguides and varying transmission with time.

Figure 4:
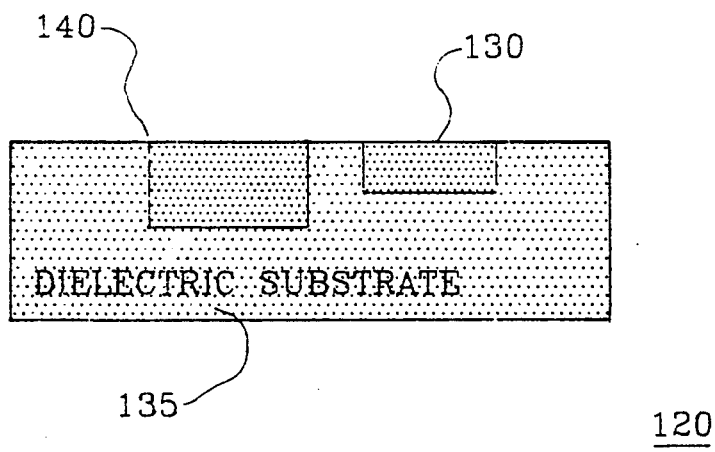
FIG. 4 is a preferred embodiment of a directional coupler comprising chirowaveguides.

One way of solving this problem is to use chirowaveguides instead of conventional waveguides in the directional couplers. Referring to FIG. 4, a preferred embodiment of a directional coupler comprising chirowaveguides in accordance with this invention is shown at 120. Dielectric substrate 135 supports chirowaveguides 130 and 140. As was shown above, the chirowaveguides 130 and 140 exhibit mode bifurcation. Therefore, even for a single-mode design, for any frequency of operation, two modes with two different guide wavenumbers, $h_{A1}$ and $h_{A2}$, propagating down the waveguide 130 may exist. In this case, it would be sufficient, for the energy transferred from guide 130 to guide 140, to have only one of these two wavenumbers, $h_{A1}$ or $h_{A2}$, matched with the wavenumbers of the neighboring waveguide 140. Therefore, the two waveguides in directional coupler 120 do not have to be identical. This offers great flexibility and reliability in the design of optical directional couplers and photonic switches. In preferred embodiments, directional couplers made of chirowaveguides may be used as switches, modulators, and mode convertors.

Another use of chirowaveguide is in the area of slow wave structures. Often, it is necessary to have a slow wave propagating inside a guided-wave structure. This is not achievable in most conventional waveguides (except in corrugated waveguides), since guided modes usually have phase velocities greater than the phase velocities of bulk modes in guiding regions of waveguides. However, in the chirowaveguides, due to double-mode propagation, it can be seen from the Brillouin diagram that there exists a region in the diagram where the guide wavenumber h can be greater than one of the bulk wavenumber, i.e., $h > k_-$ resulting in a guide phase velocity less than that of the bulk mode $k_-$ in guiding material. Such slow waves can be used in a variety of applications such as prism couplers, energy pumping and input-output coupling.

Figure 5:
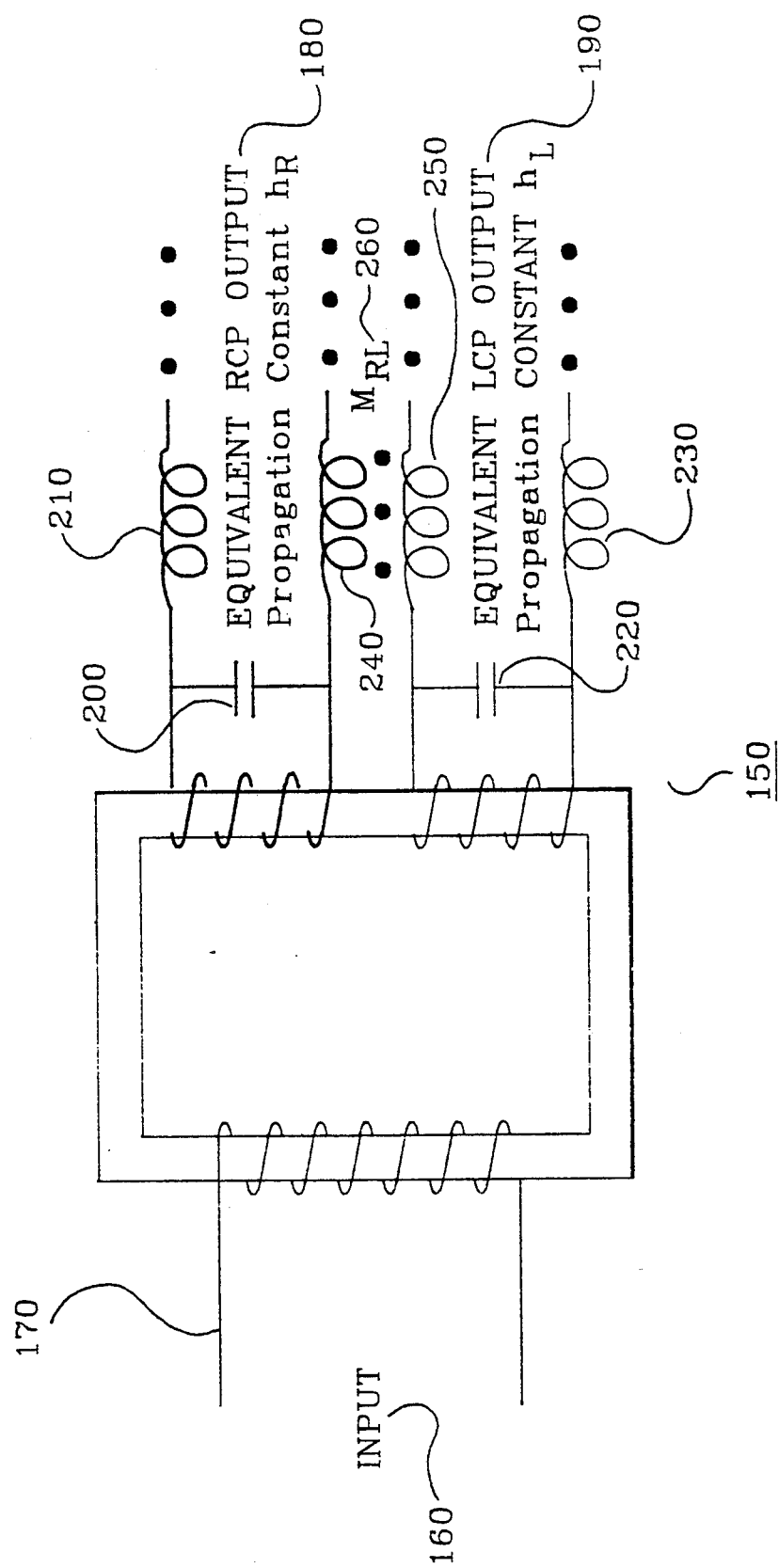
FIG. 5 is an equivalent circuit of the directional coupler of FIG. 4.

Referring to FIG. 5, an equivalent circuit 150 for the chirowaveguide directional coupler of FIG. 4 is shown. The input 160 is an entering electromagnetic wave which is coupled by the transformer 170 to either of two output modes 180 and 190. Mode 180 is the right-handed circularly polarized mode while mode 190 is the left-handed circularly polarized mode. Capacitor 200 and inductor 210 in combination determine the propagation constant of mode 180 while capacitor 220 and inductor 230 in combination determine the propagation constant of mode 190. Furthermore, coils 240 and 250 determine the amount of coupling 260 between modes 180 and 190.

There are several embodiments provided in accordance with this invention. While preferred embodiments have been disclosed and described, it will be recognized by those with skill in the art that modifications are within the true spirit and scope of the invention. The appended claims are intended to cover all such modification.

What is claimed is:

1. An electromagnetic wave direction coupler comprising:
    a substrate;
    first chiral waveguide means comprising a first chiral medium interfaced with the substrate wherein bifurcated electromagnetic modes are allowed whereby when electromagnetic energy incidents the electromagnetic wave direction coupler the first chiral medium causes the electromagnetic energy to propagate according to two modes of propagation in the first chiral medium; and
    second chiral wave guide means comprising a second chiral medium interfaced with the substrate wherein bifurcated electromagnetic modes are allowed for receiving electromagnetic energy coupled from the first chiral waveguide means whereby when electromagnetic energy is coupled from the first chiral medium, the second chiral medium causes the electromagnetic energy to propagate according to two modes of propagation in the second chiral medium.

2. The electromagnetic wave directional coupler recited in claim 1 wherein the substrate is a substantially dielectric substrate.

3. The electromagnetic wave directional coupler recited in claim 2 wherein the two modes of propagation in the first and second chiral media are a right circularly polarized mode and a left circularly polarized mode.

4. The electromagnetic wave directional coupler recited in claim 3 wherein the first and second chiral media are substantially isotropic chiral media.

5. The electromagnetic wave directional coupler recited in claim 4 wherein the substantially isotropic first and second chiral media further comprise homogenous, low loss substantially isotropic chiral media.

* * * * *